Aug. 10, 1943.   R. MAYNE   2,326,477
TRACK AND GROUSER THEREFOR
Filed March 4, 1941
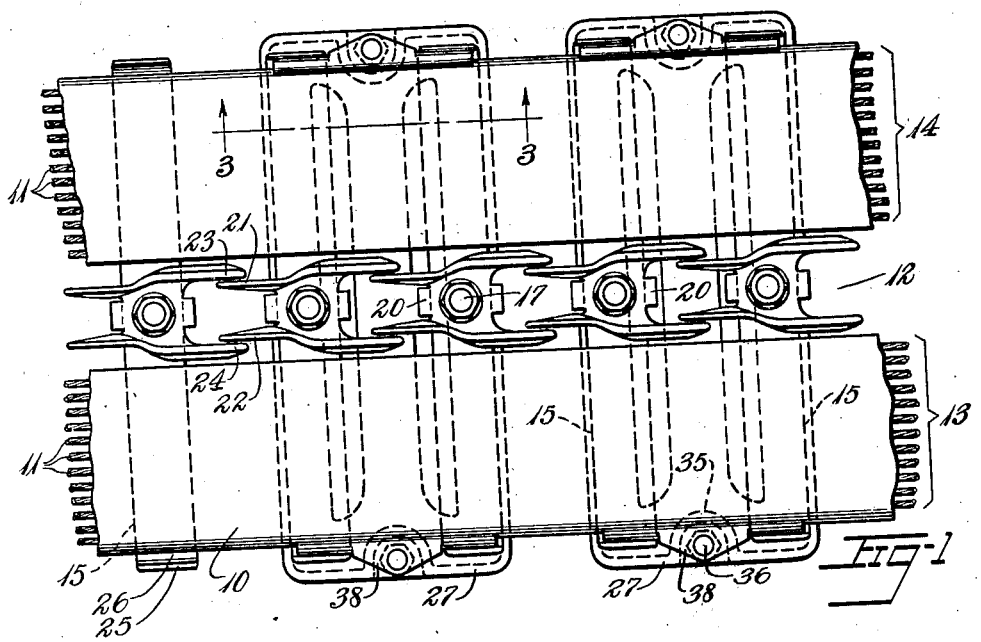
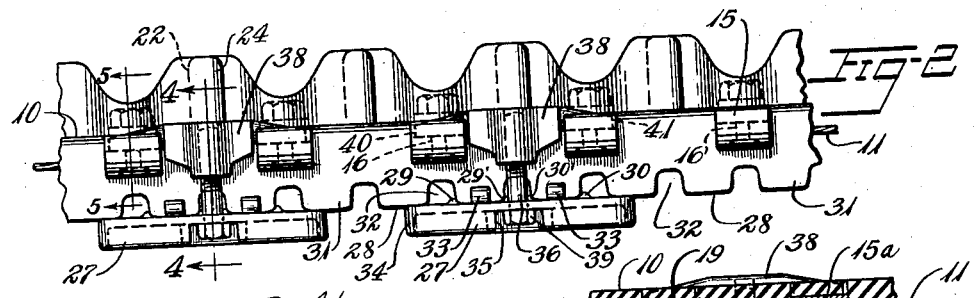
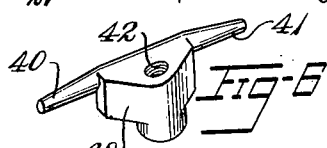
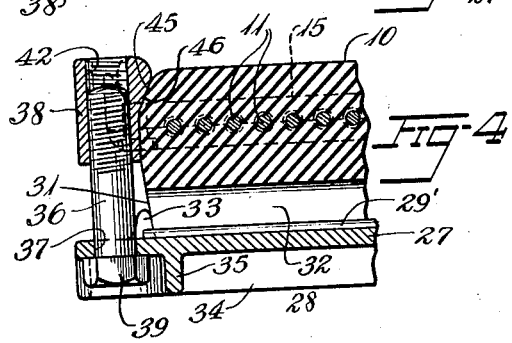
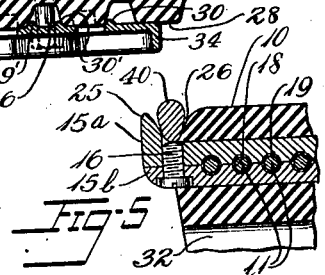
Inventor
Robert Mayne
By Willis F. Avery
Atty.

Patented Aug. 10, 1943

2,326,477

UNITED STATES PATENT OFFICE 2,326,477

TRACK AND GROUSER THEREFOR

Robert Mayne, Akron, Ohio, assignor to The B. F. Goodrich Company, New York, N. Y., a corporation of New York Application March 4, 1941, Serial No. 381,648

10 Claims. (Cl. 305—10)

This invention relates to grouser equipped track for self-laying track vehicles and especially to fastening means therefor.

In the self-laying track types of vehicles an endless track is trained about guiding and driving wheels so that a substantially straight reach of the track contacts with the supporting surface and supports the vehicle therefrom over a great area of surface.

It has been proposed to equip such tracks with removable grousers for soft slippery soil or ice or snow. Such grousers have been difficult to apply without undue stiffening of the track, and have been difficult to retain in proper relation to the track.

The present invention aims to provide means for overcoming these difficulties.

The principal objects of the invention are to provide security of attachment without substantial increase in the width of the track, to provide ease and rapidity of replacement, to maintain clamping pressure of the grousers with respect to the resilient tread, and generally to provide simplicity of construction and convenience of manufacture and assembly.

These and other objects will appear from the following description and the accompanying drawing.

Of the drawing:

Fig. 1 is a plan view of a portion of the track as seen from the wheel-contacting back thereof, parts being broken away.

Fig. 2 is a side elevation thereof, parts being broken away.

Fig. 3 is a detail sectional view taken along line 3—3 of Fig. 1.

Fig. 4 is a detail sectional view taken along line 4—4 of Fig. 2.

Fig. 5 is a detail sectional view taken along line 5—5 of Fig. 2.

Fig. 6 is a perspective view of the bridge member.

Features of the invention are applicable to tracks of various constructions. In the illustrative embodiment shown in the drawing, the invention is applied to a track in which a group of longitudinal tension members in the form of flexible cables are held in spaced-apart relation by longitudinally spaced-apart cross-bars which act as driving members for transmitting power from the sprockets to the track, and the cables and cross-bars are embedded in a body of rubber or other rubber-like material.

In accordance with the invention, the cross-bars have ends exposed at the sides of the rubber body in the form of hooks. Grouser plates, preferably of metal, are held against the tread face of the rubber body by screw bolts passing through the grousers and threaded through bridge members which engage a plurality of the hooked ends of the cross-bars. Projections on the rear face of the grousers cooperate with grooves in the tread face of the rubber body and with marginal surfaces thereof to retain the grousers against shifting movements.

Referring to the drawing, the numeral 10 designates the tread body of the track of rubber or other rubber-like material which encloses a group of parallel spaced-apart tension members 11 in the form of metal cables. The tread body is divided longitudinally to provide a longitudinal space 12 for clearing the driving members and the cables 11 are separated thereby to provide two groups of cables 13 and 14. The cables are held in spaced-apart relation by driving members in the form of longitudinally spaced-apart cross-bars 15 each comprising a pair of bar members 15a, 15b held together by bolts 16 at their ends and bolts 17 at their centers. The bar members are formed with complementary half-round grooves 18 which enclose the tension members. The tension members are enclosed by a resilient covering layer 19 of rubber or other rubber-like material over which the bar members are secured. The arrangement is such that the rubber layer 19 transmits the load from the cross-bars to the cables by shear loading of the rubber.

Wear plates 20 are secured to the cross-bars by the bolts 17 and are adapted to be engaged by the drive sprocket. Parallel flanges 21, 22 and 23, 24 are formed on the wear plates and act to guide the track by cooperating with grooves in the guide wheels and driving wheels. Flanges 21, 22 have sliding engagement with the flanges 23, 24 on the adjacent cross-bar to prevent side-sway of the track.

To provide for securing grousers to the track, the ends of the cross-bars are exposed at each side of the rubber tread body and the cross-bar members 15a are turned back at their ends to provide hooks 25 defining between the hooks and the tread body a groove 26 for retaining grouser securing means.

The grousers 27 are preferably of metal and are adapted to be clamped against the resilient tread face 28 of the rubber body 10. Each grouser has a substantially flat face for engaging the face 28 of the rubber body and ribs 29, 29', 30, 30' may be formed thereon to engage the margin of raised elements 31 of the tread body defined by grooves 32 formed therein. Additional ribs or lugs 33 may be provided on the grousers for engaging the sides of the tread body. The ribs and lugs prevent slippage of the grousers along the tread surface of the rubber body.

Downwardly turned ribs 34 are provided on the grousers for penetrating the soft earth to increase traction. These are preferably in the form of marginal flanges although other ribs, such as 35 may be provided.

For securing the grousers to the resilient body of the track without restricting objectionably the flexing of the track or its cables in use, screw-bolts 36 have their shanks extending through clearance holes 37 in the grousers and are threaded to engage bridge members 38, the heads 39 of the screw bolts, preferably of hexagonal shape, being seated against the grousers. The clearance of holes 37 permits a limited hinging action of the grousers 27 for self-adjustment against the track thread. Each bridge member 31 has a pair of horns 40, 41 adapted to seat in the notches 26 formed between the tread body 10 and the hooks 25 of adjacent cross-bars, and also has a threaded aperture 42 adapted to engage the threaded portions of the screw-bolts 36. By tightening the bolts, the grousers are seated firmly against the tread surface of the rubber body of the track which is compressed slightly by drawing up the bolts so as not to loosen during use of the track, the rubber being resilient and held under compression.

To provide additional means for securing the grousers, the sides of the rubber tread body 10 may be formed with an inclined face 45 and the bridge member 38 may be formed with a complementary face 46 which is inclined to the axis of the bolt 36 so that when the bolt is tightened the face 46 is cramped against the surface 45.

The flanges or ribs 34 of the grousers are of such depth as to shield the heads 39 of the bolts 36 from contact with concrete pavements, rocks, or other abrasive surfaces during operation of the vehicle.

The grousers seat against the tread face of the rubber body 10 between successive cross-bars to which they are clamped so that as the track is flexed around the supporting wheels of the vehicle, the tension on the bolts 36 is somewhat increased due to the three point suspension of the grouser afforded by its contact with the tread surface between the contacts of the horns of the bridge member with the nearest cross-bars. At the same time the tread body is somewhat thinned by such flexing of the track around the drive wheel so that substantially uniform resulting tension is present in the bolt, the resilience of the rubber body compensating for any difference in tension of the bolt and preventing any slipping of the grouser along the tread.

As the grousers are not directly secured to the tension members, and the tension members are resiliently cushioned from the cross-bars which in turn are free to rock with respect to the bridge member, with which they have hinging movement, the tension members are free to flex with the passing of the track about the driving and guiding wheels.

The grousers may be readily applied while the track is in place on the vehicle and as many may be applied to the track as there are spaces between cross-bars although a less number may be applied if desired as each grouser is independent of the others.

Variations may be made without departing from the scope of the invention as it is defined by the following claims:

I claim:

1. A track for a self-laying track vehicle, said track comprising a flexible band-like body of rubber-like material having a tread face, cross members in said body and having exposed ends, and a grouser at the tread face of said body and having holding means engaging exposed ends of a plurality of cross members for hinging movement with relation to each said member in directions both longitudinal and crosswise of the track.

2. A track for self-laying track vehicles, said track comprising a body of rubber-like material, cross members in said body and having hooked ends exposed at the margins of said body, a grouser at a tread face of said body, a bridge member having its ends pivotally seated on successive hooked ends at a margin of the body, and means for clamping said grouser to an intermediate portion of said bridge member.

3. A track for self-laying track vehicles, said track comprising a body of rubber-like material having a tread face, flexible tension members extending therethrough in spaced-apart relation, longitudinally spaced apart cross-bars resiliently secured to said tension members and having ends exposed at the margins of said body, said ends defining with the faces of said body notches for securing grousers, a grouser seated against the tread face of said body, bridge members engaging each of two successive cross-bars and seated in said notches and detachable retaining means for securing said grouser to an intermediate portion of said bridge member.

4. A grouser structure for a self-laying track having cross members disposed with end portions thereof at the side margins of the track, said structure comprising a grouser member positionable at and entirely across the tread face of the track, bridge members at opposite sides of the track each engageable with two cross members at said end portions thereof, and means for connecting said grouser member and bridge members at an intermediate position of said members.

5. A grouser structure as defined in claim 4 in which said grouser member and bridge member are connected for relative hinging movement.

6. A grouser structure as defined in claim 4 in which the connecting means comprises an element extending from the grouser member and engaging a midportion of the bridge member.

7. A grouser structure as defined in claim 4 in which the connecting means comprises an element extending from the bridge member and engaging a midportion of the grouser member.

8. A grouser structure as defined in claim 4 in which the connecting means comprises a bolt extending with clearance through said grouser member and threadedly engaging a midportion of said bridge member.

9. A grouser structure for a self-laying track having cross members disposed with end portions thereof at the side margins of the track, said structure comprising a grouser member positionable at the tread face of the track and extending from one side margin of the tread face to the other, bridge members having end portions adapted to be seated for rocking movement at opposite margins of the track upon two cross members at said end portions thereof, and means for connecting said grouser member and bridge members.

10. A grouser structure for a self-laying track having cross members disposed with end portions thereof at the side margins of the track, said structure comprising a grouser member positionable at the tread face of the track, a bridge member having end portions adapted to be seated for rocking movement upon two cross members at said end portions thereof, and hinging joint means for connecting said grouser member and bridge member at an intermediate region thereof comprising means for drawing the two toward each other.

ROBERT MAYNE.